March 28, 1961 L. G. LEWIS 2,977,474
HYDROGEN-CARBON ANALYZER
Filed Aug. 31, 1956
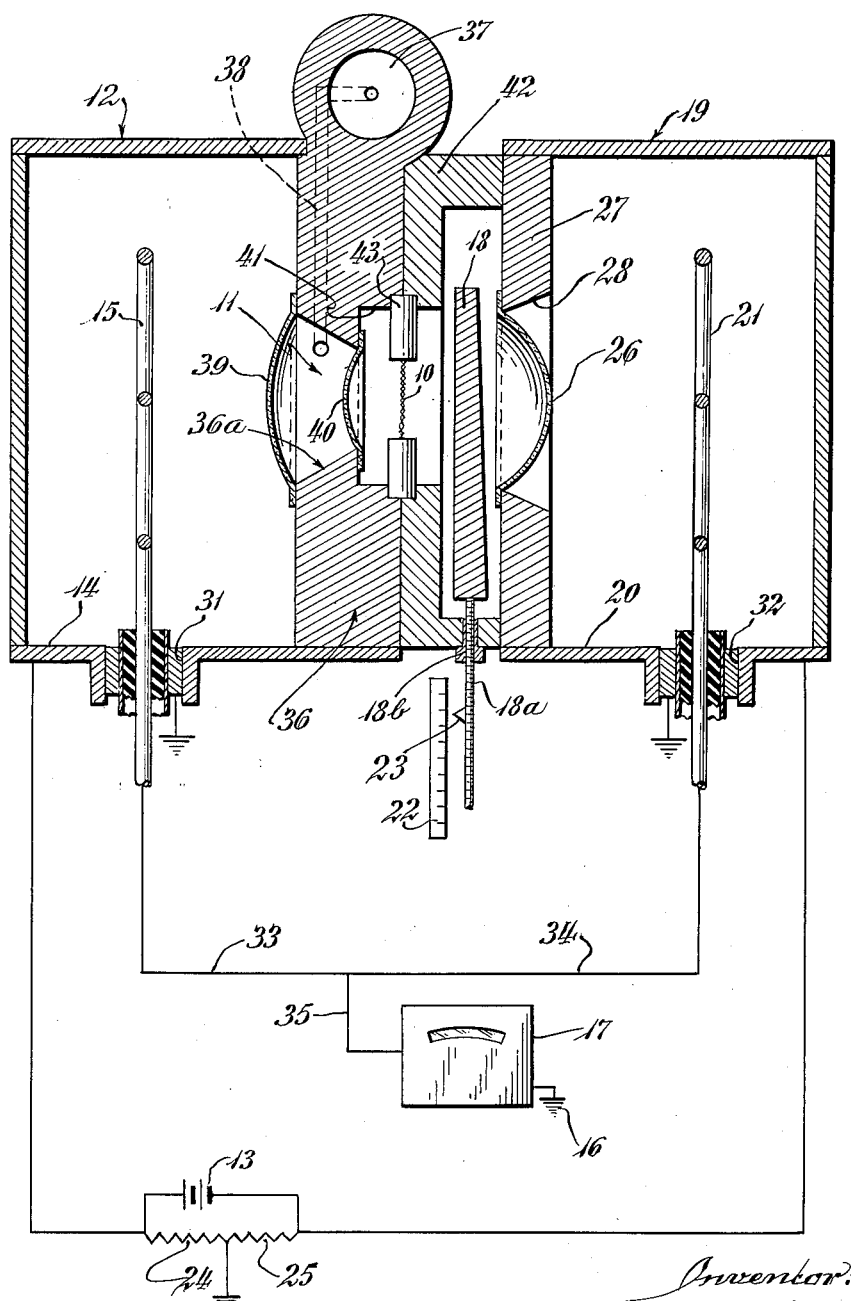
Inventor:
Lloyd G. Lewis
By Everett A. Johnson
Attorney

2,977,474
HYDROGEN-CARBON ANALYZER

Lloyd G. Lewis, La Grange, Ill., assignor to Standard Oil Company, Chicago, Ill., a corporation of Indiana Filed Aug. 31, 1956, Ser. No. 607,469

2 Claims. (Cl. 250—43.5)

This invention relates to improved method and apparatus for conducting hydrogen analyses. It pertains more particularly to an improved apparatus employing a beta ray source and sample and reference ion chamber detectors.

A system has been devised for determining the percent hydrogen of a hydrocarbon sample wherein two measurements are made; the transmission of beta rays and the specific gravity. The beta ray transmission is determined by comparison with the beta ray transmission of a standard wedge. The necessary specific gravity measurement is made by accurately weighing a bob of known weight and volume in the sample.

To measure the beta ray transmission of the sample, a beam of beta rays from a radioactive source is directed through the sample confined within a sample cell. The beta ray source may be made by depositing a thin layer of radioactive strontium salt on a thin noble metal foil. A second foil is used to cover the radioactive material and the two foils are then sealed around the edges within a holder. Such a source provides two beta ray beams, one emitting through each foil.

One beam of beta rays from such a source is directed through the sample confined in a cell and into one of two opposing ion chambers, and the second beam of beta rays from the same source passes into the second or reference chamber. A compensated movable wedge interrupts one of the beta ray beams and the movable wedge is adjusted so that equal ionization currents are produced in both ion chambers.

The position of the wedge indicates how much absorber wedge material was introduced to balance the beta ray beams reaching the ion chambers. The balance position of the movable wedge is accurately indicated.

The precision with which the transmission of beta radiation can be measured depends on the time available for the measurement, on the geometry of the absorbing material, on the characteristics of the sample and reference detector means, and on the strength of the source of the beta rays.

In order to obtain maximum accuracy with a given source strength, it is desired to reduce to a minimum the amount of non-hydrocarbon absorber in one beam of beta rays. It is, therefore, a primary object of the invention to provide an apparatus including a minimum of non-hydrocarbon absorber.

Heretofore, apparatus has been devised wherein a hydrocarbon liquid sample is contained between two flat windows separated by a known distance. However, the energy spectrum of beta rays is such that only a few percent of the rays have sufficient energy to penetrate such a sample cell along a path which is parallel to the axis of the cell. A very much smaller percentage of the rays leaving the source have sufficient energy to penetrate the larger distance of a ray which is transverse to the axis of the cell. On the other hand, none of the rays are able to penetrate through a cell at a large angle of obliqueness. As a result, the effective solid angle through which rays may leave a given point on the source is very materially less than the solid angle subtended by the sample cell walls.

It is, therefore, another object of this invention to provide a cell geometry which avoids the above-described condition and thereby increases the effective size of a given source. These and other objects of my invention will become apparent as the description thereof proceeds.

Briefly, according to my invention, the geometry of the sample cell is designed to provide the optimum path length for the rays emitted by an extended source of beta rays. The path lengths provided by my cell structure are sufficiently equal so that the effective solid angle through which rays may leave any part of the source is determined by the geometry of the sample cell block. The best location of the center of the spherical windows are found by ray tracing techniques and location is dependent on the solid angle through which rays may leave the center of the source and still pass through the sample cell. Thus, I provide a pair of windows which are curved and which have a common center located at a point adjacent and behind the source. Since spherical windows are more rigid structurally for the same window thickness as compared to planar windows, the sensitivity of my instrument is increased by increasing the sample path an amount corresponding to the decrease in the thickness of the windows.

Further, according to my apparatus, a calibrated movable wedge constitutes the non-hydrocarbon absorber in the beam to the reference ion chamber. As a result, the percent change in thickness over the length of the wedge is materially reduced and may be easily fabricated from a low thermal coefficient alloy. The cell block, closing one end of the sample ion chamber, is made from a material of high thermal conductivity so that the two chamber cell windows will be maintained at substantially the same temperature.

For a given angle or radiation, the closer the wedge is to the source, the less will be the spread in distances travelled by rays passing through the wedge and, according to my invention, the wedge can be located closer to the source than was heretofore possible. Thus, the error in percentage hydrogen measurement is minimized by employing my design features.

The sample cell for determining the absorption of beta radiation must be equipped with windows of sufficient strength to contain the sample in a fixed geometry and at the same time be sufficiently thin so as to absorb little of the beta rays. By choosing material for the cell windows which has substantially the same thermal expansion coefficient as the sample cell block on which the windows are mounted, a change in block temperature will not result in a distortion of the windows and hence will avoid changing the geometry of the sample during test. Brass and copper have been found to be suitable window materials for mounting on a copper block.

Further details and advantages of the invention will be described in connection with the accompanying schematic diagram of one form of the apparatus.

In the drawing, I have schematically illustrated a null-type instrument employing sample and reference ion chambers and a beta ray source for the determination of beta ray transmission. For this purpose, a beam of beta rays from the double-faced radiation source 10 is directed through the sample confined in cell 11 which comprises the window of the sample ion chamber 12. The beta rays which reach the sample ion chamber 12 cause a positive electric current to flow from the battery 13, to the cell wall 14, to the collector 15 and then to ground 16 through the high sensitivity current indicator 17.

The second beam of beta rays from source 10 passes through movable wedge 18 and into the reference ion chamber 19. The beta rays from source 10 which reach chamber 19 cause a negative current to flow from the battery 13 to the cell walls 20, to the collector 21 and then to ground 16 through the current indicator 17. When the ion chambers 12 and 19 conduct equal currents, zero net current passes through the current indicator 17.

The operator achieves balance, i.e. equal currents from chambers 12 and 19 by adjusting the movable wedge 18 for zero current as indicated by the current indicator 17. The position of the wedge 18 is calibrated with pure compounds of known composition, the scale 22 with the pointer 23 indicating the position of the wedge 18. Shaft 18a, controlling wedge 18, is threaded through nut 18b fixed to ring 42.

By using a single battery 13 with its ends grounded through the equal resistors 24 and 25, the relative sensitivities of the ion chambers 12 and 19 are effected equally by changes in battery voltage. If desired, an electrically insulated tube (not shown) keeps the gas in both ion chambers 12 and 19 at the same temperature, pressure and humidity thereby aiding in maintaining constant relative sensitivity between the two ion chambers 12 and 19.

The ion chambers 12 and 19 may comprise essentially brass cylinders about three inches long and about four inches in diameter. Chamber 19 is provided with circular window 26 to allow the beta rays to enter. Lead shield 27 is provided with conical window 28 in register with the circular window 26 on the front wall of the chamber 19. Chamber 12 is closed by sample cell block 36. The collectors 15 and 21 are essentially wheels with four spokes mounted with their planes perpendicular to the direction of the beta rays.

The collectors 15 and 21 are well insulated from ground 16 and from the walls of the ion chambers 12 and 19 by means of plug insulators 31 and 32 extending through the walls of the chambers 12 and 19. The collectors 15 and 21 are connected to each other by shielded leads 33 and 34 and to the current indicator 17 by very high resistance shielded cable 35. The ring 42, supporting holder 43, electrically insulates chamber 19 from chamber 12.

The sample cell structure or block 36 includes a sample cell 11 and a reservoir 37 integral therewith to form the single massive all-copper unit which closes one end of the ion chamber 12. A channel 38 connects the base of the reservoir 37 with the cell 11. The cell 11 is filled by pouring the sample into the reservoir 37 through a suitable filling funnel and in flowing from the reservoir 37 via the channel 38 to the sample cell 11, the sample is quickly brought to the block temperature.

The sample cell 11 in the copper block 36 may be made by sealing two spherical windows 39 and 40 on each end of a truncated conical bore 36a cut through the copper block 36. The filling channel 38 is drilled into the copper block 36 to meet the cell 11 at its lowest point. An air vent channel (not shown) can be provided to meet the cell 11 at its highest point to prevent the collection of air bubbles therein.

The source 10 is secured across annular recess 41 in block 36 about the narrower end of the bore 36a which comprises the walls of the sample chamber cell 11. A removable ring 42 retains the beta ray source holder 43 containing the source 10. A suitable source 10 and source holder 43 is that described in U.S. Patent 2,700,111 and further details thereof will not be given herein.

From the above, it will be seen that I have attained the objects of my invention and have provided a beta ray analysis apparatus wherein the optimum effectiveness of the beta ray source is attained, wherein a minimum of non-hydrocarbon absorber is arranged between the source and the sample detector, and wherein the wedge is close to the source.

Although I have described the invention in terms of an example thereof, it is understood that this is intended to be by way of illustration only. Alternative embodiments of the apparatus and suitable details of construction will become apparent to those skilled in the art in view of my disclosure. Accordingly, modifications are contemplated without departing from the spirit of the invention.

What I claim is:

1. In an apparatus for determining percent hydrogen of a hydrocarbon substance and having a distributed beta ray source, a pair of opposed ionization chambers receiving radiation from said source and being in axial alignment and spaced on opposite sides of said beta ray source, a sample cell being interposed between said source and one of said ionization detectors, a movable wedge being interposed between said source and the other of said ionization detectors, a scale means for indicating the position of said wedge, electrical circuit means for placing said pair of ionization chambers under equal and opposite potentials, and null circuit means for indicating the relative output from each of said pair of ionization chambers, the improvement comprising a first and second spherical segment windows for said sample cell, each of said windows being concave with respect to said distributed beta ray source whereby the length of the beta ray paths through the cell and windows are substantially equalized across the cell, and a third spherical segment window for the ionization detector adjacent said movable wedge, said third spherical segment window also being concave with respect to the distributed beta ray source.

2. In an apparatus for determining percent hydrogen of a hydrocarbon substance and having a distributed beta ray source, a pair of opposed ionization chambers receiving radiation from said source and being in axial alignment and spaced on opposite sides of said beta ray source, a sample cell being interposed between said source and one of said ionization detectors, a sample reservoir, a channel between said reservoir and said sample cell, said reservoir, channel and sample cell being in heat conducting relationship, a torsion balance means for determining the specific gravity of a sample in said reservoir during a test, a movable wedge being interposed between said source and one of said ionization detectors, a scale means for indicating the position of said wedge, electrical circuit means for placing said pair of ionization chambers under equal and opposite electrical potentials, and null circuit means for indicating the relative output from each of said pair of ionization chambers whereby the position of said wedge may be moved to obtain equal output from each of said pair of ionization detectors and thereby provide a measure of the percent hydrogen in the hydrocarbon substance under test, the improvement comprising a first and second spherical segment windows for said sample cell, each of said windows being concave with respect to said distributed beta ray source whereby the length of the beta ray source through the cell and windows are substantially equalized across the cell, the said sample cell being of generally truncated conical shape with the spherical segment windows defining the opposite ends of the truncated conical sample cell, and the radiation-permeable window of the ionization detector adjacent the said movable wedge also being a spherical segment and concave with respect to the distributed beta ray source.

References Cited in the file of this patent

UNITED STATES PATENTS

| 2,160,081 | Niclassen | May 30, 1939 |
| 2,675,479 | Stewart et al. | Apr. 13, 1954 |
| 2,757,290 | Jacobs et al. | July 31, 1956 |